(12) United States Patent
Jochman

(10) Patent No.: US 12,068,658 B2
(45) Date of Patent: Aug. 20, 2024

(54) GENERATOR BRUSH ADAPTERS AND POWER SYSTEMS HAVING GENERATOR BRUSH ADAPTERS

(71) Applicant: Illinois Tool Works Inc., Glenview, IL (US)

(72) Inventor: Nathan Joe Jochman, Neenah, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/855,120

(22) Filed: Jun. 30, 2022

(65) Prior Publication Data

US 2024/0006951 A1     Jan. 4, 2024

(51) Int. Cl.
*H02K 5/14* (2006.01)
*H01R 39/38* (2006.01)

(52) U.S. Cl.
CPC ........... *H02K 5/141* (2013.01); *H01R 39/385* (2013.01)

(58) Field of Classification Search
CPC .............................. H02K 5/141; H01R 39/385
See application file for complete search history.

(56) References Cited

U.S. PATENT DOCUMENTS

| | | | | |
|---|---|---|---|---|
| 1,146,976 A | * | 7/1915 | Varley | H02K 21/38 310/239 |
| 1,794,291 A | * | 2/1931 | Hobart | H01R 39/385 310/241 |
| 4,562,368 A | * | 12/1985 | Weldon | H01R 39/38 310/239 |
| 5,825,114 A | * | 10/1998 | Mukai | H01R 39/20 310/248 |

* cited by examiner

*Primary Examiner* — Thomas Truong
(74) *Attorney, Agent, or Firm* — McAndrews, Held & Malloy, Ltd.

(57) ABSTRACT

Example generator brush adapters include a plate configured to mount to a static support structure and to couple to a brush assembly, such that the brush assembly is mounted to the static support structure along a single degree of freedom.

16 Claims, 8 Drawing Sheets

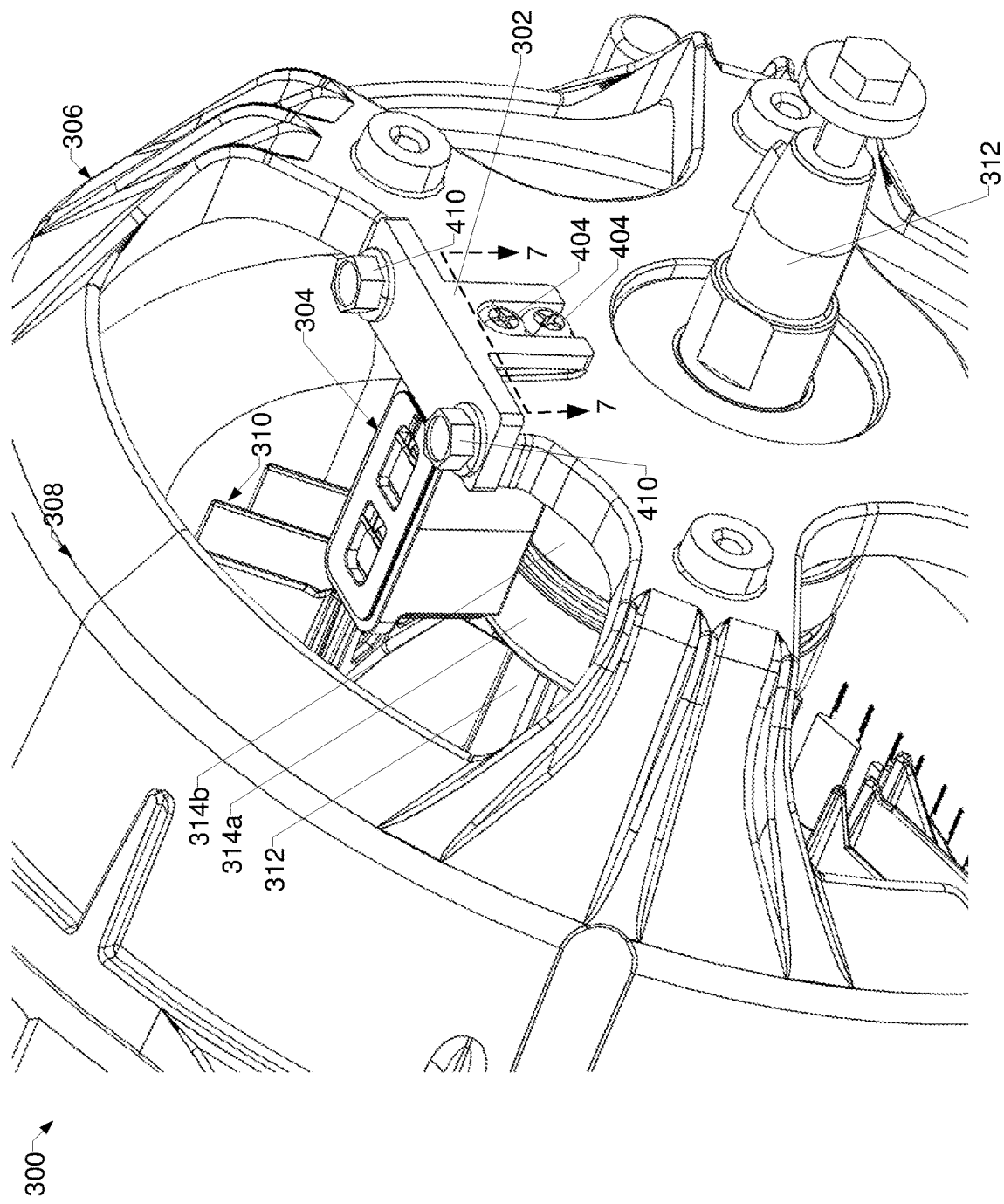

GENERATOR BRUSH ADAPTERS AND POWER SYSTEMS HAVING GENERATOR BRUSH ADAPTERS

FIELD OF THE DISCLOSURE

This disclosure relates generally to power systems and, more particularly, generator brush adapters and power systems having generator brush adapters.

BACKGROUND

Engine-driven welding equipment commonly has a generator coupled to an engine to produce electrical power for welding and/or other tool use. The generator contains a stator and rotor, in which the rotor is attached to the output shaft of the engine on one end, and supported by a bearing on the other end. The rotor is commonly a lamination stack, or core, with magnetic wire wound around the core. In the presence of electrical current flow, the rotor windings create a magnetic field in the rotor.

SUMMARY

Generator brush adapters and power systems having generator brush adapters are disclosed, substantially as illustrated by and described in connection with at least one of the figures, as set forth more completely in the claims.

BRIEF DESCRIPTION OF THE DRAWINGS

FIG. 6 is a more detailed perspective view of the example brush adapter and brush assembly installed on the generator of FIG. 3.

The figures are not necessarily to scale. Where appropriate, similar or identical reference numbers are used to refer to similar or identical components.

DETAILED DESCRIPTION

Figure 1:
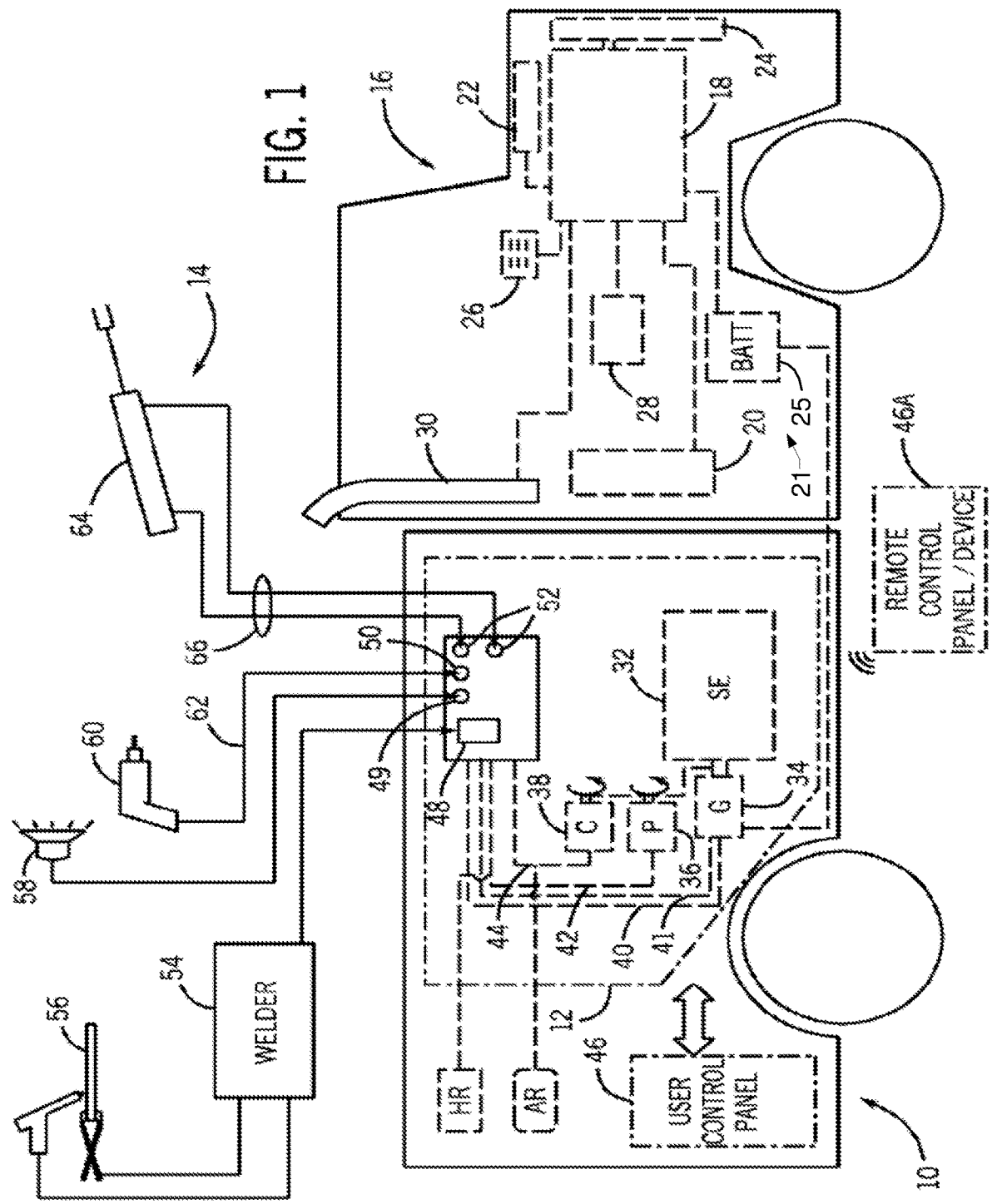
FIG. 1 is a diagrammatical overview of a work vehicle in which a service pack is installed, in accordance with aspects of the present disclosure.

Carbon brushes and a commutator set are commonly used to conduct current from a stationary support and wiring to rotating rotor windings of a generator. A mechanical connection of the brushes is made to the structural generator end housing for rigid support. Conventionally, the brushes are mechanically attached to the end housing with hardware parallel to the rotor axis and accessible from the end of the generator assembly. However, conventional attachments require additional steps for maintenance of the brushes when the system further includes a pulley, clutch, or other component (rotating or stationary) is present at or near the end of the generator shaft.

Disclosed brush adapters and power systems provide an adapter bracket that allows the existing brush assembly to be installed, removed, and secured in a direction different from the axial direction of the rotor. In disclosed examples, an adaptor can be configured to connect to conventional brush assemblies in the radial direction using conventional attachment hardware, and convert the attachment direction to a different direction (e.g., in a direction perpendicular to the axial direction of the rotor).

Disclosed example brush adapters and power systems reduce the time, cost, difficulty, and steps involved in maintenance of the brushes by end users and/or service centers. In some examples, brush adapters are configured to interface with conventional or existing brush assemblies, which reduces the components to be kept in stock by end users and/or services centers for maintenance.

Welding-type power, as used herein, refers to power suitable for welding, plasma cutting, induction heating, electrode preheating, CAC-A and/or hot wire welding/preheating (including laser welding and laser cladding).

As used herein, the terms "power system," "service pack" and "auxiliary power unit" refer to an engine driven power source which may be auxiliary or supplemental to a primary power source such as a vehicle engine.

Disclosed example generator brush adapters include a plate configured to mount to a static support structure and to couple to a brush assembly, such that the brush assembly is mounted to the static support structure along a single degree of freedom.

Disclosed example generator assemblies include: a stator; a rotor; a support structure that is stationary with respect to the stator; a rotating slip ring in electrical communication with the rotor; and a static brush assembly configured to conduct electrical current from the rotating slip ring, the static brush assembly configured to attach to the support structure in a different direction than an axial direction of the rotating slip ring.

In some example generator assemblies, the static brush assembly includes: a brush holder having a first attachment point oriented in an axial direction with respect to the rotating slip ring; and a brush adapter configured to attach to the brush holder at the first attachment point, and having a second attachment point configured to attach to the support structure in a second direction different than the axial direction. In some example generator assemblies, the second direction is perpendicular to the axial direction. In some example generator assemblies, the support structure includes a slot, in which at least one of the brush holder or the brush adapter is configured to be positioned within the slot while the brush adapter is attached to the support structure and attached to the brush holder.

In some example generator assemblies, the static brush assembly includes a brush holder configured to attach to the support structure in a direction different than an axial direction of the rotating slip ring. In some example generator assemblies, the support structure includes a tongue, in which at least one of the brush holder or the brush adapter includes a slot configured to accept the tongue to attach the brush adapter to the support structure. In some example generator assemblies, the tongue of the support structure is aligned with a direction of contact between the static brush assembly and the slip rings.

In some example generator assemblies, the brush holder is a multi-piece assembly. In some example generator assemblies, the brush adapter is a single piece. In some example generator assemblies, the support structure includes a generator support housing configured to support a distal end of the rotor.

Some example generator assemblies further include a component positioned adjacent the support structure opposite from the brush assembly. In some example generator assemblies, the component is a static component with respect to the stator. In some example generator assemblies, the component is a rotating component coupled to the rotor.

In some example generator assemblies, the support structure and the brush adapter are configured to limit installation of the brush adapter to the support structure to a single degree of freedom. In some example generator assemblies, a direction of the single degree of freedom is parallel to a direction of contact between the static brush assembly and the slip rings. In some example generator assemblies, the brush adapter includes one or more bores, and the generator assemblies further include one or more threaded studs to align the brush adapter with the support structures via the one or more bores. In some example generator assemblies, the brush adapter includes a tongue and the support structure includes a groove, in which the tongue and groove are configured to limit the installation of the brush adapter to the support structure to the single degree of freedom.

In some example generator assemblies, the rotor includes a rotor shaft, in which the one or more slip rings are arranged on the rotor shaft. In some example generator assemblies, the brush holder includes a plurality of brushes configured to conduct current in series with a corresponding plurality of slip rings.

Turning now to the drawings, and referring first to FIG. 1, a work vehicle 10 is illustrated. The work vehicle 10 is shown as a work truck, although any suitable configuration for the vehicle may be envisaged. In the illustrated embodiment, the vehicle includes a service pack, designated generally by reference numeral 12 for supplying electrical, compressed air and hydraulic power to a range of applications, designated generally by reference numeral 14. The work vehicle 10 has a main vehicle power plant 16 based around a vehicle engine 18. Example work vehicle engines of this type may be diesel engines, gasoline engines, and/or mixed ethanol-gasoline engines.

The vehicle power plant 16 includes a number of conventional support systems. For example, the engine 18 will consume fuel from a fuel reservoir 20, typically one or more liquid fuel tanks. An air intake or air cleaning system 22 supplies air to engine 18, which may, in some applications, be turbo charged or super charged. A cooling system 24, which will typically include a radiator, circulation pump, a thermostat-controlled valve and a fan, provides for cooling the engine. An electrical system includes an alternator or generator, along with one or more system batteries, cabling for these systems, cable assemblies routing power to a fuse box or other distribution system, and so forth. A lube oil system 28 will typically be included for many engine types, such as for diesel engines. As will be appreciated by those skilled in the art, such lube oil systems typically draw oil from the diesel engine crankcase, and circulate the oil through a filter and cooler, if present, to maintain the oil in good working condition. Finally, the power plant 16 will be served by an exhaust system 30 which may include catalytic converters, mufflers, and associated conduits.

The service pack 12 may include one or more service systems driven by a service engine 32. In some examples, the service pack 12 provides electrical power, hydraulic power and compressed air for the applications 14. In the diagrammatical representation of FIG. 1, for example, the service engine drives a generator 34 as well as a hydraulic pump 36 and air compressor 38. The engine itself may be of any desired type, but in a present embodiment a diesel engine is contemplated. Certain examples may use gasoline, diesel, natural gas, liquid petroleum gas, three-phase brush-type generators, and/or other engines. The generator 34 may be directly driven by the service engine 32, such as by close coupling the generator 34 to the service engine 32, or may be belt or chain driven, where desired. Presently contemplated generators include three-phase brushless types, capable of producing power for a range of applications. However, other generators may be employed, including single-phase generators and generators capable of producing multiple power outputs. The hydraulic pump 36 may be based on any conventional technology, such as piston pumps, gear pumps, vane pumps, with or without closed-loop control of pressure and/or flow. The air compressor 38 may also be of any suitable type, such as a rotary screw air compressor or a reciprocating compressor based upon one or more reciprocating pistons.

The systems of the service pack 12 will include appropriate conduits, wiring, tubing and so forth for conveying the service generated by these components to an access point. Convenient access points will be located around the periphery of the vehicle. In a presently contemplated embodiment, all of the services may be routed to a common access point, although multiple access points can certainly be envisaged. The diagrammatical view of FIG. 1 illustrates the generator 34 as being coupled to electrical cabling 40 (for AC power supply) and 41 (for 12 volt DC power supply), whereas the hydraulic pump 36 is coupled to hydraulic circuit 42, air compressor 38 is coupled to an air circuit 44. As will be appreciated by those skilled in the art, the wiring and circuitry for all three systems will typically include protective circuits for the electrical power, including fuses, circuit breakers, and so forth, as well as valving for the hydraulic and air service. For the supply of electrical power, certain types of power may be conditioned (e.g., smoothed, filtered, etc.), and 12 volt power output may be provided by rectification, filtering and regulating of AC output. Valving for hydraulic power output may include by way example, pressure relief valves, check valves, shut-off valves, as well as directional control valving. Moreover, it should be understood that, although not represented specifically in FIG. 1, the hydraulic pump will draw fluid from and return fluid to a fluid reservoir, which will typically include an appropriate vent for the exchange of air during use with the interior volume of the reservoir, as well as a strainer or filter for the hydraulic fluid. Similarly, the air compressor 38 will typically draw air from the environment through an air filter (not shown).

In some examples, the generator 34 is also coupled to the vehicle electrical system, and particularly to the vehicle battery. Thus, as described below, not only may the service pack 12 allow for 12 VDC and/or 24 VDC loads to be powered without operation of the main vehicle engine 18, but the vehicle battery may serve as a shared battery, and is maintained in a good state of charge by the service pack generator output.

The cabling and conduits 40, 41, 42 and 44 may, as in the illustrated embodiment, route service for all of these systems directly from connections on the service pack 12. In a presently contemplated embodiment, for example, connections are provided at or near a base of an enclosure of the service pack 12, such that connections can be easily made without the need to open the enclosure. Moreover, certain control functions may be available from a control and service panel 46. The service panel 46, as noted above, may be located on any surface of the vehicle, or on multiple locations in the vehicle, and may be covered by doors or other protective structures, where desired. There is no requirement, generally, that the service panel 46 be located at the same location, or even near the locations of access to the electrical, hydraulic or compressed air output points of the service pack. In a presently contemplated embodiment, the panel is provided in a rear compartment covered by an access door. The control and service panel 46 may permit, for example, starting and stopping of the service engine 32 by a keyed ignition or starter button. Other controls for the engine may also be provided on the control and service panel 46. The control and service panel 46 may also provide operator interfaces for monitoring the service engine 32, such as fuel level gages, pressure gages, as well as various lights and indicators for parameters such as pressure, speed, and so forth. The service panel may also include a stop, disconnect or disable switch (not separately shown) that allows the operator to prevent starting of the service engine 32, such as during transport.

As also illustrated in FIG. 1, a remote control panel or device 46A may also be provided that may communicate with the service panel 46 or directly with the service pack via cabling or wirelessly. In a manner similar to conventional crane or manlift controls, then, the operator may start and stop the service engine 32, and control certain functions of the service pack (e.g., engagement or disengagement of a clutched component, such as an air compressor) without directly accessing either the components within the service pack enclosure or the service panel 46.

As noted above, any desired location may be selected as a convenient access point for one or more of the systems of the service pack. In the illustrated embodiment, for example, one or more alternating current electrical outputs, which may take the form of electrical receptacles 48 (for AC power, such as 120 VAC and/or 240 VAC power) and 49 (for DC power, such as 12 VDC and/or 24 VDC power) are provided. The service panel 46 may enable a user to select output configurations for the receptacles 48, 49. Similarly, one or more pneumatic connections, typically in the form of a quick disconnect fitting may be provided as indicated at reference numeral 50. Similarly, hydraulic power and return connections 52 may be provided, which may also take the form of quick disconnect fittings.

In the embodiment illustrated in FIG. 1, the applications 14 may be coupled to the service pack 12 by interfacing with the outputs provided by receptacle 48. For example, a portable welder 54 may be coupled to the AC receptacle 48, and may provide constant current or constant voltage-regulated power suitable for a welding application. As will be appreciated by those skilled in the art, the welder 54 itself may receive power from the electrical output of the generator, and itself contain circuitry designed to provide for appropriate regulation of the output power provided to cables suitable for a welding application 56. Some examples include welders, plasma cutters, and so forth, which may operate in accordance with any one of many conventional welding techniques, such as gas metal arc welding (GMAW), shielded metal arc welding (SMAW), flux-cored arc welding (FCAW), gas tungsten arc welding (GTAW), and so forth. Although not illustrated in FIG. 1, certain of these welding techniques may call for or conveniently use wire feeders to supply a continuously fed wire electrode, as well as shielding gasses and other shielding supplies. Such wire feeders may be coupled to the service pack 12 and powered by the service pack 12, where desired.

Similarly, DC loads may be coupled to the DC receptacle 49. Such loads may include lights 58, or any other loads that would otherwise be powered by operation of the main vehicle engine. It should also be noted that, as mentioned above, the 12 volt DC output of the service pack also serves to maintain the vehicle battery charge, and to power any ancillary loads that the operator may need during work (e.g., cab lights, hydraulic system controls, etc.).

The pneumatic and hydraulic applications may be similarly be coupled to the service pack as illustrated diagrammatically in FIG. 1. For example, a hose 62 or other conduit may be routed from the compressed air source at the outlet 50 to a tool, such as an impact wrench 60. Many such pneumatic loads may be envisaged. Similarly, a hydraulic load, illustrated in the form of a reciprocating hydraulic cylinder 64 may be coupled to the hydraulic circuit 42 by means of appropriate hoses or conduits 66. As noted above, and as will be appreciated by those skilled in the art, certain of these applications, particularly the hydraulic applications, may call for the use of additional valving, particularly for directional control and load holding. Such valving may be incorporated into the work vehicle or may be provided separately either in the application itself or intermediately between the service pack and the hydraulic actuators. It should also be noted that certain of the applications illustrated diagrammatically in FIG. 1 may be incorporated into the work vehicle itself. For example, the work vehicle may be designed to include a man lift, scissor lift, hydraulic tail gate, or any other driven systems which can be coupled to the service pack and driven separately from the main vehicle engine.

The service pack 12 may be physically positioned at any suitable location in the vehicle. In a presently contemplated embodiment, for example, the service engine 32 may be mounted on, beneath or beside the vehicle bed or work platform rear of the vehicle cab. In many such vehicles, for example, the vehicle chassis may provide convenient mechanical support for the engine and certain of the other components of the service pack. For example, steel tubing, rails or other support structures extending between front and rear axles of the vehicle may serve as a support for the service engine 32. It should be noted that, depending upon the system components selected and the placement of the service pack 12, reservoirs may be provided for storing hydraulic fluid and pressurized air (denoted HR and AR, respectively in FIG. 1). As will be appreciated by those skilled in the art, however, the hydraulic reservoir may be placed at various locations or even integrated into the service pack enclosure. Likewise, depending upon the air compressor selected, no reservoir may be required for compressed air.

In use, the service pack will provide power for the on-site applications completely separately from the vehicle engine. That is, the service engine 32 generally may not be powered during transit of the vehicle from one service location to another, or from a service garage or facility to a service site. Once located at the service site, the vehicle may be parked at a convenient location, and the main engine 18 may be shut down. The service engine 32 may then be powered, to provide service from one or more of the service systems described above. Where desired, clutches, or other mechanical engagement devices may be provided for engagement and disengagement of one or more of the generator, the hydraulic pump and the air compressor, depending upon these service are required. Moreover, as in conventional vehicles, where stabilization of the vehicle or any of the systems is require, the vehicle may include outriggers, stabilizers (not shown), and so forth which may be deployed after parking the vehicle and prior to operation of the service pack. One or more of the services provided by the work vehicle 10 may be performed without the need to operate the main vehicle engine at a service site.

Figure 2:
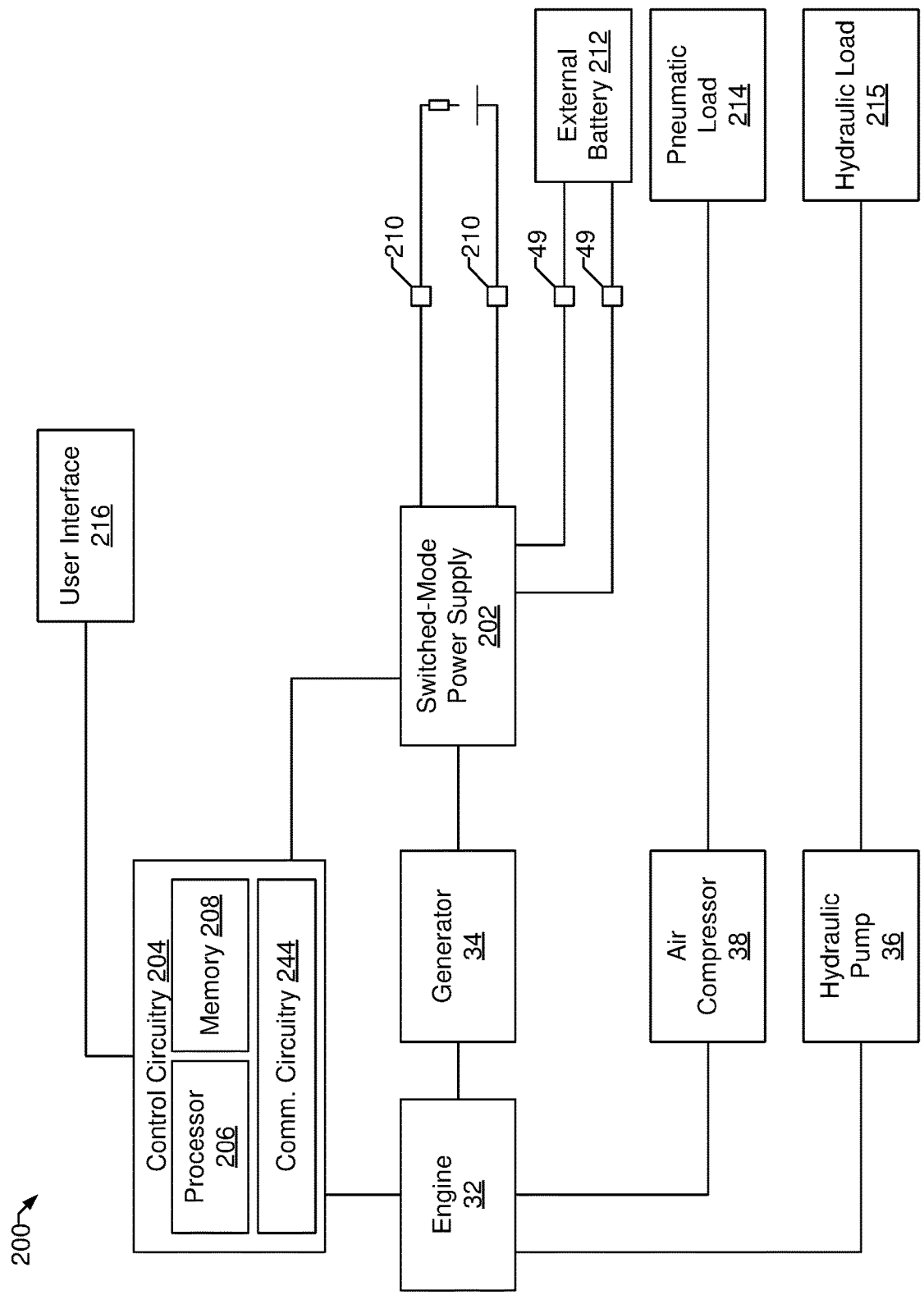
FIG. 2 is a block diagram of an example power system that may be used to implement the service pack of FIG. 1.

FIG. 2 is a block diagram of an example power system 200 that may be used to implement the service pack 12 of FIG. 1. The example power system 200 includes the service engine 32, the generator 34, the hydraulic pump 36, the air compressor 38, a switched-mode power supply 202, and the control circuitry 204.

The switched-mode power supply 202 converts the electrical power from the generator 34 to output power. Generally, the switched-mode power supply 202 includes a rectifier, a boost converter, an inverter, a transformer, an output stage, and/or any other circuitry. However, other configurations of the switched-mode power supply 202 may be used. The output power may include welding-type power, and/or non-welding AC and/or DC electrical power (e.g., DC battery charging power). In some examples, the generator 34 outputs AC power at a predetermined voltage (e.g., 120 VAC, 240 VAC) and a predetermined frequency (e.g., 50 Hz, 60 Hz, 400 Hz).

The control circuitry 204 includes one or more p rocessor(s) 206 and a machine readable memory 208 or other storage device to store instructions for execution by the processor(s) 206. The example control circuitry 204 controls the output of the switched-mode power supply 202 based on the desired load or task. In some examples, the control circuitry 204 and/or a separate engine control unit (ECU) control the speed of the engine 32, which controls an input to the switched-mode power supply 202 (via the generator 34). For example, the control circuitry 204 may control switching elements of the boost converter and/or the inverter stages of the switched-mode power supply 202 to control voltage, current, frequency, and/or other characteristics of the output from the switched-mode power supply 202. The control circuitry 204 may control the switched-mode power supply 202 to provide voltage-controlled welding power, current-controlled welding power, battery-charging power, AC power for electrical tools, and/or any other type of welding-type and/or non-welding-type electrical power. For example, the switched-mode power supply 202 may output welding-type power via welding terminals 210, and/or non-welding power via the DC receptacle 49. For example, the switched-mode power supply 202 may output DC power to charge an external battery 212 via the DC receptacle 49.

The air compressor 38 provides air pressure to one or more pneumatic load(s) 214, such as pneumatically powered tools. The hydraulic pump 36 provides hydraulic power to one or more hydraulic load(s) 215.

The power system 200 includes a user interface 216, which includes an input device 218. The input device 218 is configured to receive inputs selecting mode(s) 222, 224 representative of welding-type processes, mode(s) 226, 228 representative of one or more battery charging modes, mode(s) 230 representative of a vehicle load, and/or other modes such as a pneumatic load 232, and/or a hydraulic load 234. The example user interface 216 further includes indicators 236, 238, 240, 242. The example input device 218 is a rotary encoder device, and provides a signal to the control circuitry 204 based on the selected mode 222-234.

The example user interface 216 may further include controls configured to modify welding and/or battery charging parameters, such as a welding voltage setpoint, a welding wire feed speed setpoint, a welding current setpoint, a nominal battery output voltage, a workpiece material thickness, welding wire parameters (e.g., thickness, type, etc.), a DC output current limit, and/or any other parameters. In some examples, the control circuitry 204 automatically determines one or more welding and/or battery charging parameters based on the input device 218 and additional controls, such as by determining a welding voltage and wire feed speed based on a specified material thickness.

The control circuitry 204 receives an input selecting one or more of the modes 222-234 from the user interface 216 (e.g., from the input device 218). Additionally or alternatively, the control circuitry 204 may receive the input selecting one or more of the modes 222-234 via a wireless or wired interface to an external device. For example, the control circuitry 204 may be communicatively connected to a computer, a smartphone, tablet computer, and/or any other operator interface device (e.g., via communication circuitry 244), through which an operator can control the power system 200 (e.g., select any of the modes 222-234 for operation).

Example welding-type process modes 222, 224 include a gas metal arc welding process, a flux cored arc welding process, a shielded metal arc welding process, a tungsten inert gas welding process, an induction heating process, a cutting process, or a gouging process. In some other examples, the modes 222, 224 may include predetermined welding schedules corresponding to sets of welding parameters. Example battery charging modes 226, 228 may include bulk or constant current charging mode, absorption or constant voltage charging mode, float mode, and/or jump starting mode. Additionally or alternatively, the battery charging modes 226, 228 are divided by nominal voltage of the subject battery, such as 12 VDC nominal voltage or 24 VDC nominal voltage, and the control circuitry 204 manages the charging modes. In some examples, two or more battery charging modes may specify the current limit, such as a first current limit for battery charging and a second current limit for jump starting an engine.

While the example input device is a rotary encoder, other types of input devices may be used, such as a rotary switch, a pushbutton switch, a menu selection, a touchscreen, and/or any other input device. Additionally or alternatively, the indicators 236-242 may be replaced by a digital display, an LCD display, conventional indicator lights, and/or any other indicator device. While the indicators 236-242 correspond to example modes of operation (e.g., a battery charging indicator 236, a jump starting indicator 238, a welding indicator 240, and a vehicle battery indicator 242), the indicators 236-242 may correspond to other modes of operation. For example, the user interface 216 may include an indicator for each weld process, battery charging mode, and/or other output that may be selected and/or output by the power system 200.

The control circuitry 204 determines the selected mode of operation of the switched-mode power supply 202 based on the signal from the input device 218, and controls the indicators 236-242 based on the selected mode of operation. For example, when one of the welding processes 222, 224 is selected, the control circuitry 204 controls a "welding" indicator 240 to be illuminated. The control circuitry 204 further controls the switched-mode power supply 202 to output power based on the selected mode of operation. The example control circuitry 204 may also control a speed of the engine 32 based on the selected mode of operation and the current load on the switched-mode power supply 202.

Figure 3:
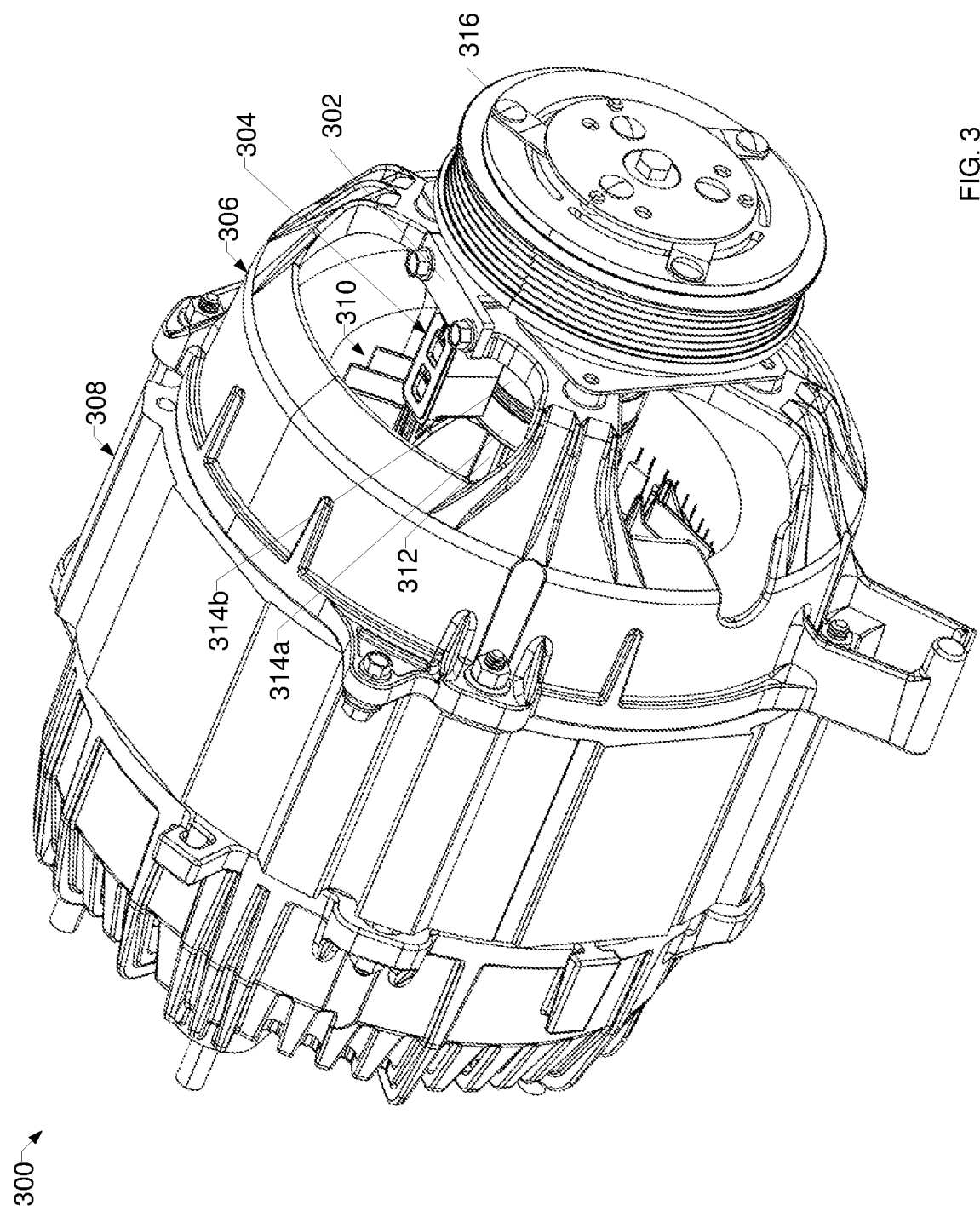
FIG. 3 illustrates an example generator that may be used to implement the generator of FIG. 2, including a brush adapter.

FIG. 3 illustrates an example generator 300 that may be used to implement the generator 34 of FIG. 2, including a brush adapter 302 configured to hold a brush assembly 304. The example generator 300 includes a housing 306, which may include one or more housing components that at least partially house a stator assembly 308 and a rotor assembly 310. The rotor assembly 310 is coupled to a rotor shaft 312 and outputs a generator output voltage that is accessible via slip rings 314a, 314b attached to the rotor shaft 312.

To conduct the generator output to a stationary output load, the example generator 300 includes the brush assembly 304. The brush assembly 304 includes conductive brushes, which contact the slip rings for conduction of the generator output. The brush assembly 304 includes a housing, which may be a single piece or a multi-piece assembly, which supports and holds the conductive brushes stationary. The brush assembly 304 is supported by the generator housing 306 in a position in which the brushes of the brush assembly 304 contact the slip rings 314a, 314b.

Due to the relative motion between the conductive brushes and the slip rings 314a, 314b, the conductive brushes of the brush assembly 304 are subject to wear and require occasional or regular replacement. Replacement of the brushes involves removal of the brush assembly 304 from the generator housing 306.

In the example of FIG. 3, the rotor shaft 312 is further coupled to a pulley 316 external to the generator housing 306. The pulley 316 is positioned adjacent the location on the generator housing 306 to which the brush assembly 304 is attached (e.g., opposite the brush assembly 304). In conventional generator systems, a brush assembly is attached directly to a generator housing via a bolt or other connection in the axial direction of the rotor shaft. As a result, attachments such as the pulley 316 that block access to the attachment points of conventional brush assemblies may increase the number of steps involved in servicing (e.g., replacing) conventional brush assemblies. Other components, such as a belt drive, a muffler, sheet metal, a lift structure, and/any other internal component of the power system may be in a blocking position instead of or in addition to the pulley 316. The component(s) may be static with respect to the generator housing 306 and the stator assembly 308 and/or may be a rotating component coupled to the rotor shaft 312.

Figure 4:
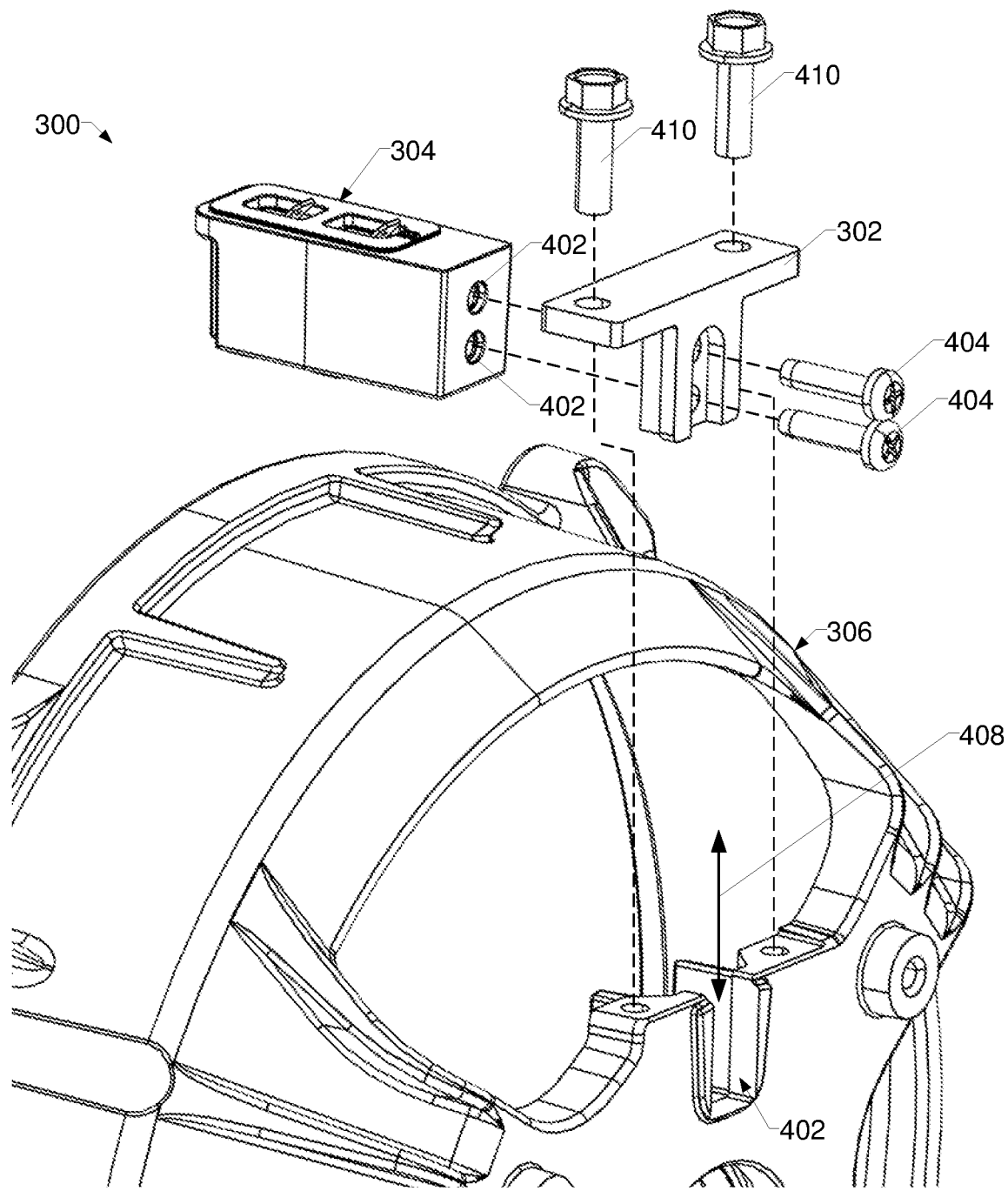
FIG. 4 is an exploded view of the example brush assembly, brush adapter, and generator housing of FIG. 3.

To increase access to the brush assembly 304 in the presence of accessories such as the pulley 316, the example generator 300 includes the brush adapter 302. FIG. 4 is an exploded view of the example brush assembly 304, the brush adapter 302, and generator housing of FIG. 3, in which a blocking component such as the pulley 316 of FIG. 3 is omitted to improve visibility.

The example brush adapter 302 is a plate that mounts to the generator housing 306 or other static support structure on the generator 300 and further couples to the brush assembly 304. The brush adapter 302 may be a single piece or a multi-piece assembly. As illustrated in FIG. 4, the brush assembly 304 includes attachment points 402 oriented in a first direction. For example, the attachment points 402 may be threaded holes which receive bolts 404 oriented in the radial direction of the rotor shaft 312. The bolts 404 and attachment points 402 rigidly attach the brush assembly 304 to the brush adapter 302.

In the example of FIG. 4, the generator housing 306 includes a slot 406 into which the brush adapter 302 is inserted. The slot 406 and the brush adapter 302 are configured to limit movement between the brush adapter 302 and the generator housing 306, as well as movement between the brush assembly and the generator housing 306, to a single degree of freedom. The single degree of freedom is illustrated in FIG. 4 as direction 408, which is parallel to a direction of contact between the brush assembly 304 and the slip rings 314a, 314b. The example brush adapter 302 is secured to the generator housing 306 via bolts 410, which are oriented perpendicularly to the axis of rotation of the rotor shaft 312 of FIG. 3.

By providing for installation and removal of the brush assembly 304 in the direction 408, the example brush adapter 302 improves the accessibility to the brush assembly 304 and/or removes time, cost, and steps involved in replacing or otherwise maintaining the brush assembly 304.

Figure 5A:
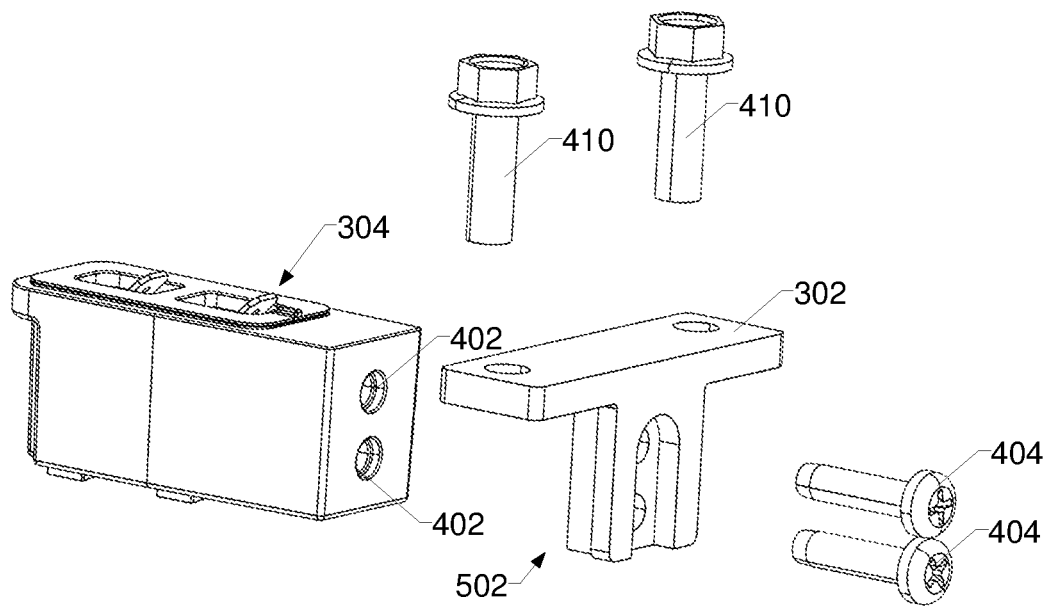
FIGS. 5A and 5B illustrate exploded views of the example brush assembly and brush adapter of FIG. 4.
Figure 5B:
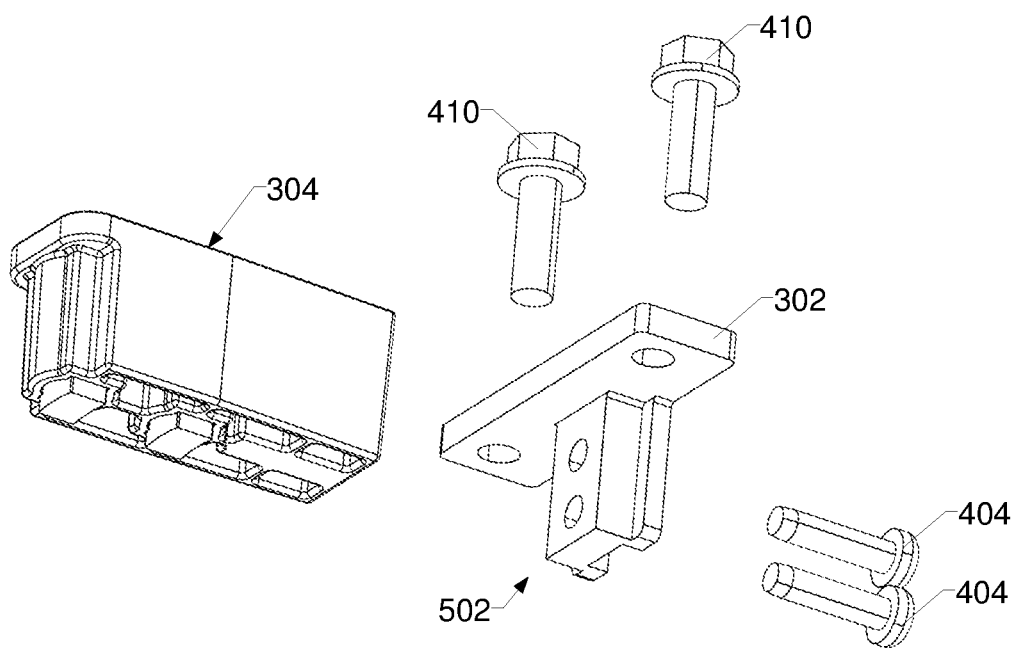

FIGS. 5A and 5B illustrate exploded views of the example brush assembly 304 and brush adapter 302 of FIG. 4. FIG. 6 is a more detailed perspective view of the example brush adapter 302 and brush assembly 304 installed on the generator of FIG. 3, in which a radial blocking component such as the pulley 316 of FIG. 3 is omitted to improve visibility.

Figure 7:
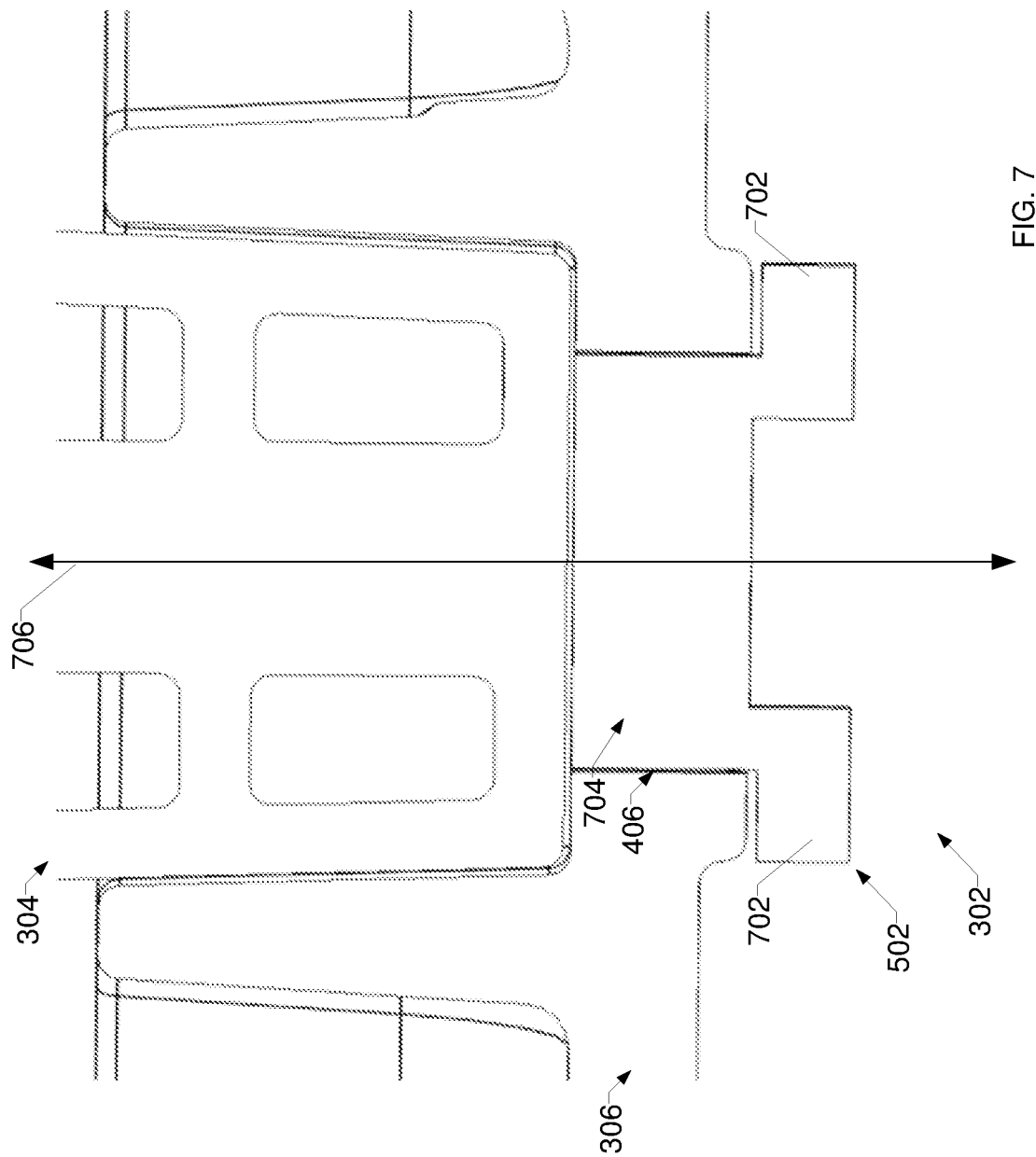
FIG. 7 illustrates a cross-section of the generator housing and the tongue of the brush adapter when installed into the slot of the generator housing.

As illustrated in FIGS. 5A and 5B, a tongue 502 (or lower portion) of the brush adapter 302 includes projections which, in cooperation with the slot 406 of FIG. 4, limit the motion of the brush adapter 302 to the single degree of freedom 408. FIG. 7 illustrates a cross-section of the generator housing 306 and the tongue 502 of the brush adapter 302 when installed into the slot 406 of the generator housing 306. As shown in FIG. 7, the tongue 502 of the brush adapter 302 includes flanges 702 and a central portion 704. The central portion has a first width to fit within the slot 406, while the flanges 702 cooperate with the body of the brush assembly 304 to restrict movement in the axial direction 706 of the rotor shaft 312.

While the tongue 502 of the brush adapter 302 and the slot 406 of the generator housing 306 have first profiles, other profiles and/or features may be used. For example, the generator housing 306 may include a projection or other protruding feature within the slot 406 that mates with a channel or slot formed into the brush adapter 302 to limit the motion of the brush adapter 302 in directions other than the direction 408. Additionally or alternatively, the brush adapter 302 may include bores (e.g., one, two, or more) to allow for threaded studs to align the brush adapter 302 with the desired location on the generator housing 306.

While example features to limit the degrees of freedom of the brush adapter 302 and the brush assembly 304 are disclosed above, other features or components may be used. For example, the generator housing 306 may include a rail or other alignment feature on a side of the generator housing 306 facing the rotor assembly 310, and the brush adapter 302 includes a slot configured to fit over the rail to limit insertion and removal of the brush adapter 302 onto the rail to a single degree of freedom. However, any other features may be used.

Figure 8A:
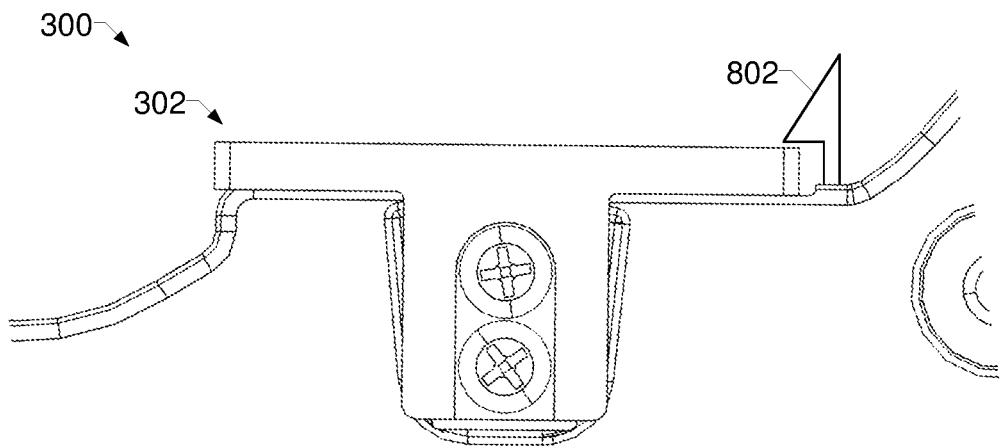
FIGS. 8A and 8B are elevation views of the example brush adapter installed in the generator housing, including example retention features.
Figure 8B:
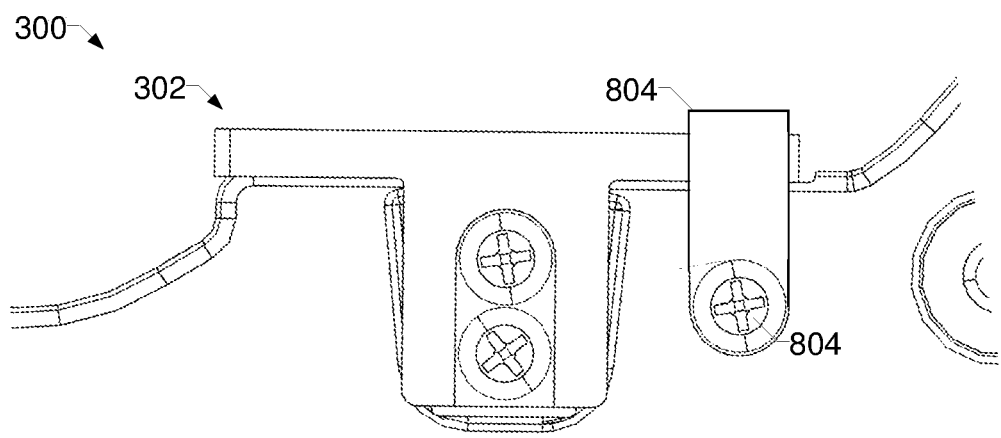

FIGS. 8A and 8B are elevation views of the example brush adapter installed in the generator housing, including example retention features. As illustrated in FIG. 8A, a retractable clip 802 may be attached to the generator housing 306 to retain the brush adapter 302 within a fully seated or installed position in the slot 406. The clip 802 may be pushed or deflected to allow removal of the brush adapter 302 from the slot 406. While an example clip geometry and location are illustrated, the clip 802 may be implemented using different geometries and/or locations with respect to the slot 406 and/or the generator housing 306.

As illustrated in FIG. 8B, a strap 804 is attached to the generator housing 306, and is extended and secured over the brush adapter 302 to retain the brush adapter 302 within the slot 406. The strap 804 may be attached via a fastener 806 (e.g., a screw, a pin, etc.), via a clip, and/or by any other attachment techniques. Furthermore, the strap 804 may be positioned at a different point with respect to the slot 406, may extend over multiple sections of the brush adapter 302, and/or may be otherwise configured to retain the brush adapter 302 within the slot 406. Additionally or alternatively, the strap 804 may be rigid or semi-rigid, similar to a clip, that extends over the brush adapter 302.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present disclosure. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A generator assembly, comprising:
   a stator;
   a rotor;
   a support structure that is stationary with respect to the stator;
   a rotating slip ring in electrical communication with the rotor; and
   a static brush assembly configured to conduct electrical current from the rotating slip ring, the static brush assembly configured to attach to an exterior surface of the support structure in a different direction than an axial direction of the rotating slip ring, wherein the static brush assembly comprises:
   a brush holder having a first attachment point oriented in an axial direction with respect to the rotating slip ring; and
   a brush adapter configured to attach to the brush holder at the first attachment point, and having a second attachment point configured to attach to the support structure in a second direction different than the axial direction.

2. The generator assembly as defined in claim 1, wherein the second direction is perpendicular to the axial direction.

3. The generator assembly as defined in claim 1, wherein the support structure comprises a slot, at least one of the brush holder or the brush adapter configured to be positioned within the slot while the brush adapter is attached to the support structure and attached to the brush holder.

4. The generator assembly as defined in claim 1, wherein the static brush assembly comprises a brush holder configured to attach to the support structure in a direction different than an axial direction of the rotating slip ring.

5. The generator assembly as defined in claim 1, wherein the brush holder is a multi-piece assembly.

6. The generator assembly as defined in claim 1, wherein the brush adapter is a single piece.

7. The generator assembly as defined in claim 1, wherein the support structure comprises a generator support housing configured to support a distal end of the rotor.

8. The generator assembly as defined in claim 1, further comprising a component positioned adjacent the support structure opposite from the brush assembly.

9. The generator assembly as defined in claim 8, wherein the component is a static component with respect to the stator.

10. The generator assembly as defined in claim 8, wherein the component is a rotating component coupled to the rotor.

11. The generator assembly as defined in claim 1, wherein the support structure and the brush adapter are configured to limit installation of the brush adapter to the support structure to a single degree of freedom.

12. The generator assembly as defined in claim 11, wherein a direction of the single degree of freedom is parallel to a direction of contact between the static brush assembly and the slip rings.

13. The generator assembly as defined in claim 11, wherein the brush adapter comprises one or more bores, and further comprising one or more threaded studs to align the brush adapter with the support structures via the one or more bores.

14. The generator assembly as defined in claim 11, wherein the brush adapter comprises a tongue and the support structure comprises a groove, the tongue and groove configured to limit the installation of the brush adapter to the support structure to the single degree of freedom.

15. The generator assembly as defined in claim 1, wherein the rotor comprises a rotor shaft, the one or more slip rings arranged on the rotor shaft.

16. The generator assembly as defined in claim 1, wherein the brush holder comprises a plurality of brushes configured to conduct current in series with a corresponding plurality of slip rings.

* * * * *